(12) United States Patent
Hattori et al.

(10) Patent No.: US 11,760,394 B2
(45) Date of Patent: Sep. 19, 2023

(54) AIR-CONDITIONING CONTROL SYSTEM FOR RAILROAD VEHICLE

(71) Applicant: Mitsubishi Electric Corporation, Tokyo (JP)

(72) Inventors: Takashi Hattori, Tokyo (JP); Yasuyuki Miyazaki, Tokyo (JP); Yoshitaka Ono, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 224 days.

(21) Appl. No.: 17/432,771

(22) PCT Filed: May 7, 2019

(86) PCT No.: PCT/JP2019/018274
§ 371 (c)(1),
(2) Date: Aug. 20, 2021

(87) PCT Pub. No.: WO2020/225853
PCT Pub. Date: Nov. 12, 2020

(65) Prior Publication Data
US 2022/0144320 A1   May 12, 2022

(51) Int. Cl.
*G06F 17/00* (2019.01)
*B61D 27/00* (2006.01)

(52) U.S. Cl.
CPC .................... *B61D 27/00* (2013.01)

(58) Field of Classification Search
CPC ............................ B61D 27/00; B61D 27/0018
(Continued)

(56) References Cited

U.S. PATENT DOCUMENTS 5,467,277 A * 11/1995 Fujisawa ............. B60W 30/182
                                                                701/1
6,129,025 A * 10/2000 Minakami ............... B60L 13/03
                                                             104/88.01
(Continued)

FOREIGN PATENT DOCUMENTS

JP     2000018684 A    1/2000
JP     2005195208 A    7/2005
(Continued)

OTHER PUBLICATIONS

Railway AC_AC Variable frequency drives (Year: 2019).*
(Continued)

*Primary Examiner* — Ronnie M Mancho
(74) *Attorney, Agent, or Firm* — BUCHANAN INGERSOLL & ROONEY PC

(57) ABSTRACT

An air-conditioning control system includes a first inverter that drives a first driving target in accordance with commands received via a first communication network, a second inverter that drives a second driving target in accordance with commands received via the first communication network, a first controller that is capable of controlling the first inverter and the second inverter by transmitting commands via the first communication network, and a second controller that is capable of controlling the first inverter and the second inverter by transmitting commands via the first communication network. Each of the first controller and the second controller is capable of transmitting, to the first inverter and the second inverter via the first communication network, an invalidation command for invalidating the commands therefrom.

9 Claims, 14 Drawing Sheets

(58) Field of Classification Search
USPC .......................................................... 701/19
See application file for complete search history.

(56) References Cited

U.S. PATENT DOCUMENTS

| | | | | |
|---|---|---|---|---|
| 8,384,238 | B2* | 2/2013 | Yoshida | B60R 16/0215 |
| | | | | 307/9.1 |
| 8,519,571 | B2* | 8/2013 | Yoshida | H02G 3/0462 |
| | | | | 307/147 |
| 10,579,121 | B2* | 3/2020 | Koker | G06F 1/3209 |
| 10,654,494 | B2* | 5/2020 | Tashiro | B60H 1/00978 |
| 2011/0025245 | A1* | 2/2011 | Jeung | H02P 6/182 |
| | | | | 318/400.26 |
| 2013/0229052 | A1* | 9/2013 | Kitanaka | B60L 3/0046 |
| | | | | 307/9.1 |
| 2019/0126949 | A1* | 5/2019 | Tashiro | B60H 1/3225 |
| 2020/0369120 | A1* | 11/2020 | Miyazaki | B60H 1/00978 |
| 2022/0176965 | A1* | 6/2022 | Gesang | B60W 10/26 |

FOREIGN PATENT DOCUMENTS

| | | |
|---|---|---|
| WO | 2012073351 A1 | 6/2012 |
| WO | 2019082401 A1 | 5/2019 |

OTHER PUBLICATIONS

Why use rectifier inverter in locomotives? (Year: 2017).*
Velociti Rail (Year: 1975).*
Extended European Search Report dated May 9, 2022, issued in corresponding European Patent Application No. 19927958.9, 7 pages.
International Search Report (PCT/ISA/210) with translation and Written Opinion (PCT/ISA/237) dated Jul. 30, 2019, by the Japan Patent Office as the International Searching Authority for International Application No. PCT/JP2019/018274.

* cited by examiner

AIR-CONDITIONING CONTROL SYSTEM FOR RAILROAD VEHICLE

TECHNICAL FIELD

The present disclosure relates to a railroad-vehicle air-conditioning control system.

BACKGROUND ART

Patent Literature 1 discloses a system that includes an air conditioner including outdoor units and indoor units that are connected with one refrigerant piping system and operates by determining, as a master controller, any one of controllers that are installed in the outdoor units, and by determining, as slave controllers, controllers other than the one controller. In this system, the master controller centrally controls refrigerant circulation operation while transmitting regularly a life message to each slave controller. The slave controller, when the life message is not received, determines that an abnormality occurs in the master controller and determines a new master controller among the slave controllers, thereby achieving automatic restoration of refrigerant control.

An air-conditioning control system is disclosed heretofore that in this manner employs, in preparation for occurrence of an abnormality in a master controller for some reason, redundant configuration in which multiple controllers are arranged.

CITATION LIST

Patent Literature

Patent Literature 1: Unexamined Japanese Patent Application Publication No. 2000-18684

SUMMARY OF INVENTION

Technical Problem

For air-conditioning control of a railroad vehicle, employing redundant configuration in which controllers and inverters are arranged in preparation for occurrence of an abnormality of a controller is necessary. However, even in the case of employing redundant configuration by applying the technique disclosed in the aforementioned Patent Literature 1, an abnormality in a controller is detectable only by the other controllers. In this case, when a controller itself operates normally but an abnormality occurs such as in a temperature sensor used for air-conditioning control by the controller or in communication between the controller and a higher-level monitor device, addressing such abnormalities is difficult.

The present disclosure is made in view of the aforementioned circumstances, and an objective of the present disclosure is to provide a railroad-vehicle air-conditioning control system that has redundant configuration including multiple controllers and inverters, and that enables, when an abnormality occurs in a controller of the controllers, the controller itself to address the abnormality and to continue normal air-conditioning operation.

Solution to Problem

To achieve the aforementioned objective, a railroad-vehicle air-conditioning control system according to the present disclosure includes a first transmission line, a first inverter to drive a first driving target in accordance with commands received via the first transmission line, a second inverter to drive a second driving target in accordance with commands received via the first transmission line, a first controller to, by transmitting commands via the first transmission line, control the first inverter and the second inverter, and a second controller to, by transmitting commands via the first transmission line, control the first inverter and the second inverter. An invalidation command for invalidating the commands from each of the first controller and the second controller is transmissible thereby to the first inverter and the second inverter via the first transmission line.

Advantageous Effects of Invention

According the present disclosure, each of the first controller and the second controller is capable of transmitting, to the first inverter and the second inverter, that a command transmitted thereby is invalid. This allows a controller to, in a case in which control of air-conditioning operation by the controller is to be stopped due to various types of factors such as abnormalities in the controller, in an environment sensor, or in communication with a higher-level monitor device, address the case by the controller itself by transmitting commands for invalidating a command from the controller itself. As a result, redundant configuration is achieved that includes multiple controllers and inverters and allows, when an abnormality occurs in a controller, the controller itself to address the occurrence of abnormality and to continue normal air-conditioning operation.

DESCRIPTION OF EMBODIMENTS

Figure 1:
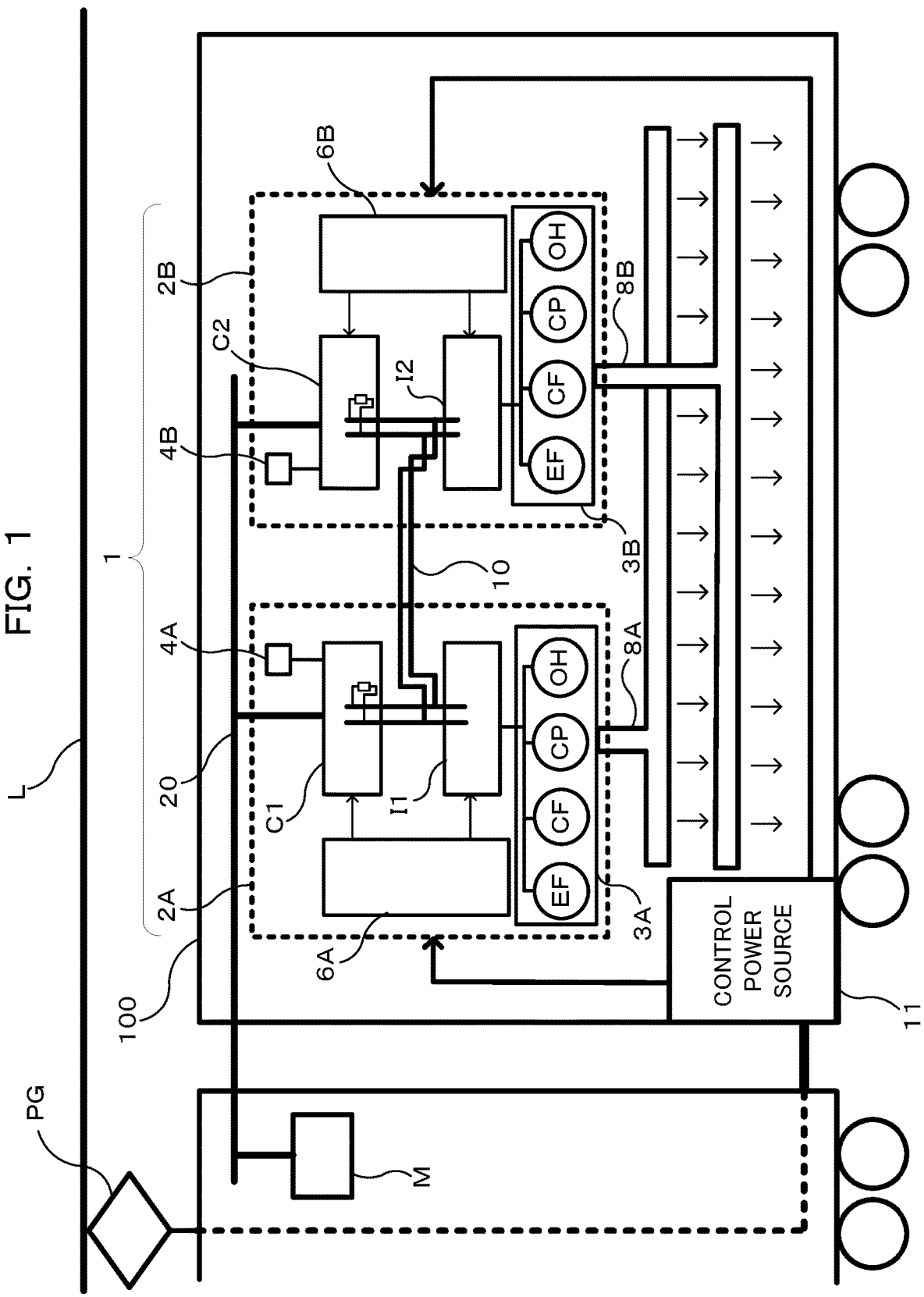
FIG. 1 is a schematic diagram illustrating configuration of an air-conditioning control system according to Embodiment 1 of the present disclosure.

Hereinafter, embodiments of the present disclosure are described in detail with reference to the drawings. In the drawings, the same reference sign is assigned to the same or equivalent parts.

Embodiment 1

First, Embodiment 1 of the present disclosure is described. As illustrated in FIG. 1, an air-conditioning control system 1 according to the present embodiment is a system that performs air-conditioning control of a railroad vehicle 100. The air-conditioning control system 1 includes air conditioners 2A and 2B.

The air conditioners 2A and 2B are capable of performing, via a second communication network 20 that is a second transmission line, data communication with a monitor M that is arranged at a driver seat of the railroad vehicle 100 and is a higher-level monitor device that is a computer for integrated management of the entire railroad vehicle 100. The monitor M operates the air conditioners 2A and 2B by transmitting operation information to the air conditioners 2A and 2B via the second communication network 20 and monitors a state of air-conditioning operation of the railroad vehicle 100 by receiving monitor information from the air conditioners 2A and 2B via the second communication network 20.

The railroad vehicle 100 is supplied electric power from an overhead wire L via a pantograph PG. This electric power is suppled to a control power source 11 of the railroad vehicle 100. The control power source 11 supplies electric power to the air conditioners 2A and 2B.

The air conditioner 2A includes: a first driving target 3A including an indoor fan EF, an outdoor fan CF, a compressor CP, and a heater OH; a first inverter I1 that drives the first driving target 3A; a first controller C1 that controls the first inverter I1; and a first power source 6A that is a power source of the air conditioner 2A. The air conditioner 2A drives the first driving target 3A, thereby performing indoor air conditioning for the railroad vehicle 100 via a duct 8A. The electric power supplied from the control power source 11 is inputted into the first power source 6A. The first power source 6A supplies necessary power for each of the first controller C1 and the first inverter I1.

The air conditioner 2B includes a second driving target 3B including an indoor fan EF, an outdoor fan CF, a compressor CP, and a heater OH, a second inverter I2 that drives the second driving target 3B, a second controller C2 that controls the second inverter I2, and a second power source 6B that is a power source of the air conditioner 2B. The air conditioner 2B drives the second driving target 3B, thereby performing indoor air conditioning for the railroad vehicle 100 via a duct 8B. The electric power supplied from the control power source 11 is inputted into the second power source 6B. The second power source 6B supplies necessary power for each of the second controller C2 and the second inverter I2.

The air-conditioning control system 1 further includes a first communication network 10 that is a first transmission line. The first communication network 10 connects the first inverter I1, the second inverter I2, the first controller C1, and the second controller C2, thereby enabling mutual data communication. Data transmitted via the first communication network 10 includes commands transmitted from the first controller C1 and the second controller C2 to the first inverter I1 and the second inverter I2, and information transmitted from the first inverter I1 and the second inverter I2 to the first controller C1 and the second controller C2 and indicating a state of the air-conditioning operation. The data communication in the first communication network 10 is performed by broadcast communication.

The first inverter I1 drives the first driving target 3A in accordance with the commands received via the first communication network 10. The second inverter I2 drives the second driving target 3B in accordance with the commands received via the first communication network 10. Driving the first driving target 3A and the second driving target 3B leads to cooling, heating, and ventilation of the railroad vehicle 100.

The air conditioner 2A includes a temperature sensor 4A that is a first sensor, and the air conditioner 2B includes a temperature sensor 4B that is a second sensor. The temperature sensor 4A detects temperature information and inputs the temperature information into the first controller C1, and the temperature sensor 4B detects temperature information and inputs the temperature information into the second controller C2. The first controller C1 and the second controller C2, based on the temperature information detected by the temperature sensors 4A and 4B, generate the commands for the first inverter I1 and the second inverter I2.

Each of the temperature sensors 4A and 4B need not be a single sensor. Each of the temperature sensors 4A and 4B may be a group of sensors arranged at the interior and exterior of the railroad vehicle 100, and in the ducts 8A and 8B.

Figure 2A:
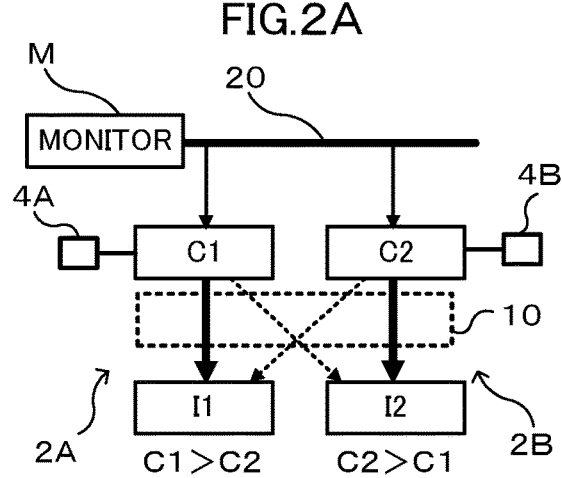
FIG. 2A is a schematic diagram illustrating a first mode of data communication in the air-conditioning control system illustrated in FIG. 1.

As illustrated in FIG. 2A, the monitor M transmits, to the first controller C1 via the second communication network 20, operation information for the air conditioners 2A and 2B and including an on-off command for air conditioning. The first controller C1 generates commands in accordance with the received operation information. The first controller C1 can, by transmitting the generated commands via the first communication network 10, control the first inverter I1 and the second inverter I2.

Additionally, the monitor M transmits, to the second controller C2 via the second communication network 20, operation information for the air conditioners 2A and 2B that includes an on-off command for air conditioning of the railroad vehicle 100. The second controller C2 generates commands in accordance with the received operation information. The second controller C2 can, by transmitting the generated commands via the first communication network 10, control the first inverter I1 and the second inverter I2.

As described above, the first controller C1 and the second controller C2 transmit commands to the first inverter I1 and the second inverter I2 via the first communication network 10. In each of the first inverter I1 and the second inverter I2, priorities between the first controller C1 and the second controller C2 are set. In accordance with the order of the priorities, the first inverter I1 operates in accordance with the commands from the first controller C1, and the second inverter I2 operates in accordance with the commands from the second controller C2.

Figure 2B:
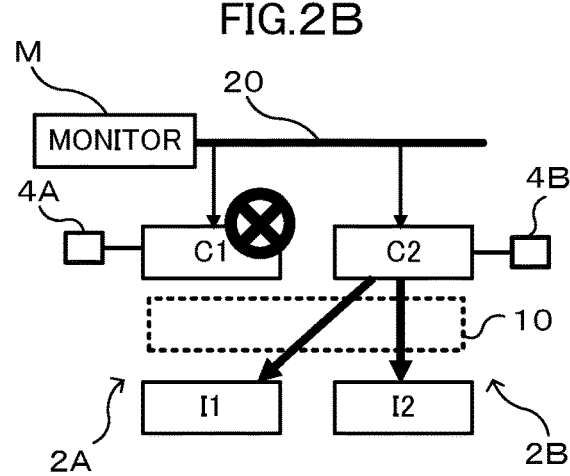
FIG. 2B is a schematic diagram illustrating a second mode of data communication in the air-conditioning control system illustrated in FIG. 1.

In the case as illustrated in FIG. 2B, in which an abnormality occurs in the first controller C1, the first controller C1 is unable to transmit the commands to the first inverter I1 and the second inverter I2 via the first communication network 10. However, since the second controller C2 transmits the commands to the first inverter I1 and the second inverter I2, the first inverter I1 and the second inverter I2 can, in accordance with operation of the second controller C2, continue to perform the air-conditioning operation.

Figure 2C:
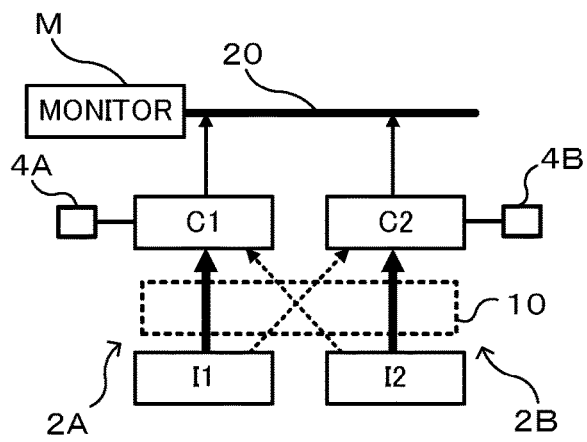
FIG. 2C is a schematic diagram illustrating a third mode of data communication in the air-conditioning control system illustrated in FIG. 1.

As illustrated in FIG. 2C, data indicating a state of the air-conditioning operation performed by the first driving target 3A driven by the first inverter I1 and by the second driving target 3B driven by the second inverter I2 is transmitted to the first controller C1 and the second controller C2 via the first communication network 10. Each of the first controller C1 and the second controller C2 transmits, to the monitor M via the second communication network 20, the data indicating air-conditioning operation as data indicating the state of the air-conditioning operation performed by the air conditioners 2A and 2B.

Figure 2D:
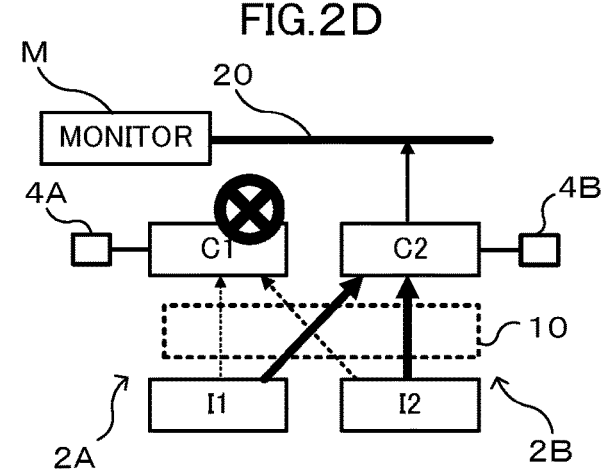
FIG. 2D is a schematic diagram illustrating a fourth mode of data communication in the air-conditioning control system illustrated in FIG. 1.

In the case as illustrated in FIG. 2D, in which an abnormality occurs in the first controller C1, the first controller C1 is unable to transmit, to the monitor M via the second communication network 20, the data indicating a state of the air-conditioning operation performed by the first driving target 3A driven by the first inverter I1 and by the second driving target 3B driven by the second inverter I2. However, the second controller C2 receives via the first communication network 10 the data indicating a state of the air-conditioning operation performed by the first driving target 3A driven by the first inverter I1 and by the second driving target 3B driven by the second inverter I2, and thus, can transmit the data to the monitor M via the second communication network 20.

Figure 3:
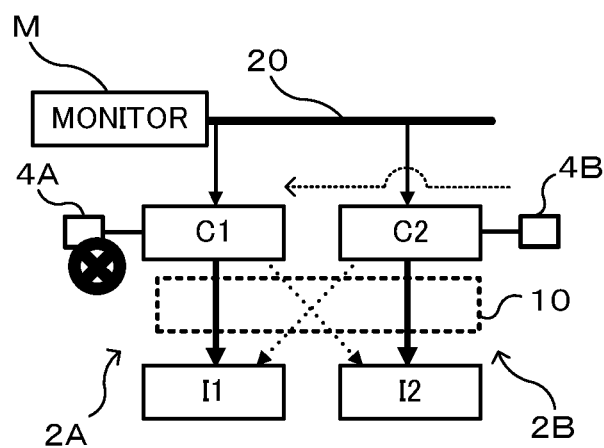
FIG. 3 is a schematic diagram illustrating a mode of data communication in the air-conditioning control system illustrated in FIG. 1, in a case of occurrence of an abnormality in a temperature sensor.

The first controller C1 generates commands for the first inverter I1 and the second inverter I2 based on the information detected by the temperature sensor 4A. However, in the case of occurrence of an abnormality in the temperature sensor 4A, the first controller C1 becomes unable to generate a command for the railroad vehicle 100 based on an accurate temperature. Thus, as illustrated in FIG. 3, the first controller C1, in the case of occurrence of an abnormality in the temperature sensor 4A, generates commands for the first inverter I1 and the second inverter I2 based on the information detected by the temperature sensor 4B and transmitted from the second controller C2 via the first communication network 10.

In the case of occurrence of an abnormality in the temperature sensor 4B, the first controller C1 and the second controller C2 execute similar processing to address the abnormality.

Figure 4:
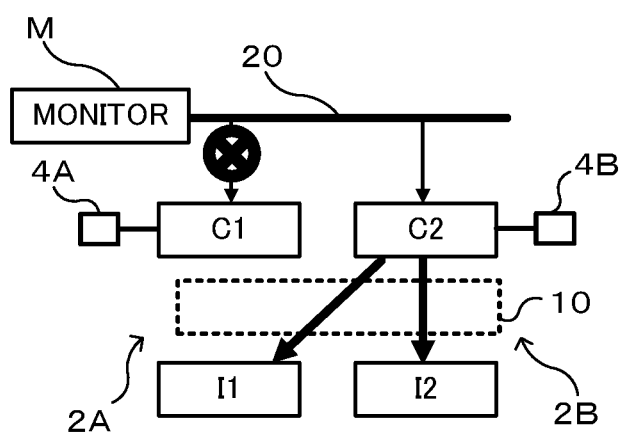
FIG. 4 is a schematic diagram illustrating a mode of data communication in the air-conditioning control system illustrated in FIG. 1, in a case of occurrence of an abnormality in communication with a monitor.

The first controller C1 and the second controller C2 controls the first inverter I1 or the second inverter I2 based on the operation information transmitted from the monitor M via the second communication network 20, as described above. However, in the case of occurrence of an abnormality in communication between the first controller C1 and the monitor M, the first controller C1 is unable to receive the operation information from the monitor M, as illustrated in FIG. 4. Thus, in the present embodiment, even upon occurrence of such abnormality, the second controller C2 transmits to the monitor M the data indicating a state of the air-conditioning operation performed by the first inverter I1 and by the second inverter I2. This allows the air conditioners 2A and 2B to continue to perform the air-conditioning operation.

Figure 5A:
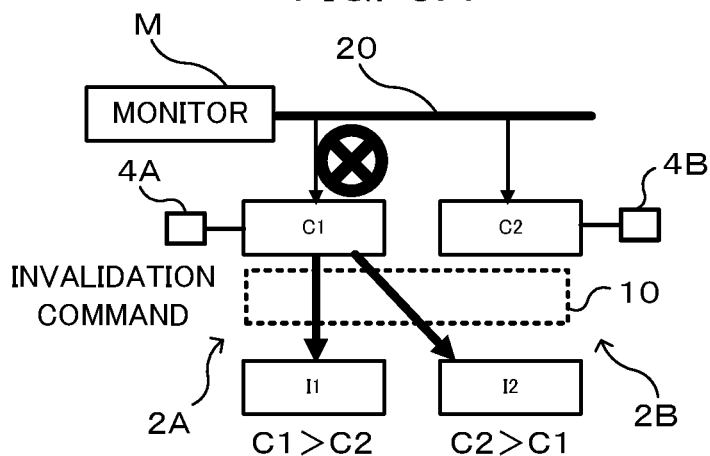
FIG. 5A illustrates a first mode for transmitting invalidation commands by a controller that is to stop control.

As described above, the air-conditioning control system 1 according to the present embodiment has redundant configuration by the inclusion of the air conditioners 2A and 2B, in preparation for a case of occurrence of an abnormality in or around the first controller C1 or the second controller C2. Specifically, for example, the first controller C1 is capable of transmitting, to the first inverter I1 and the second inverter I2 via the first communication network 10, invalidation commands for invalidating a command therefrom, as illustrated in FIG. 5A.

Transmitting the invalidation commands allows the first inverter I1, in which the first controller C1 is set to be higher in priority than the second controller C2, to operate in accordance with the command from the second controller C2. The second controller C2 can also transmit the invalidation commands for invalidating a command therefrom.

For example, the first controller C1 is capable of transmitting, upon detecting an abnormality in communication with the monitor M, to the first inverter I1 and the second inverter I2 via the first communication network 10, the invalidation commands for invalidating a command therefrom. The first controller C1 generates a command based on a number of passengers that is transmitted from the monitor M, and thus, performing suitable air-conditioning control becomes difficult upon the occurrence of the abnormality in communication with the monitor M.

Transmitting the invalidation commands allows the first inverter I1, in which the first controller C1 is set to be higher in priority than the second controller C2, to operate in accordance with the command from the second controller C2. This applies similarly to a case of the second controller C2.

Figure 5B:
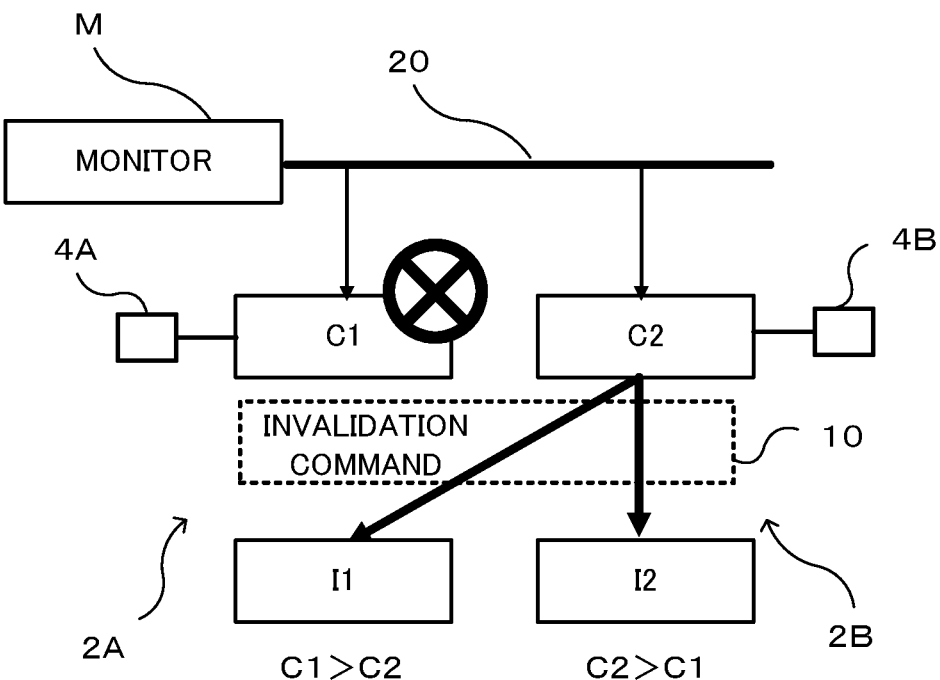
FIG. 5B illustrates a second mode for transmitting invalidation commands by a controller that is to stop control.

Additionally, as illustrated in FIG. 5B, the second controller C2 is capable of transmitting, when the first controller C1 is not performing control, to the first inverter I1 and the second inverter I2 via the first communication network 10, the invalidation commands for invalidating a command from the first controller C1. This applies similarly to a case of the second controller C2.

Furthermore, as illustrated in FIGS. 2A and 2B, the second controller C2 transmits, upon detecting that the first controller C1 is not performing control of the first inverter I1 and the second inverter I2, control commands to the first inverter I1 and the second inverter I2 via the first communication network 10. The case in which the first controller C1 is not performing control of the first inverter I1 and the second inverter I2 includes, for example, a case of occurrence of an abnormality in the first controller C1. The first controller C1 executes processing similar to that executed by the second controller C2

Occurrence of an abnormality in one of the first controller C1 or the second controller C2 is detectable by both the one and the other of the first controller C1 and the second controller C2 based on presence/absence of data communication. Additionally, abnormalities in the temperature sensors 4A and 4B are detectable by both the first controller C1 and the second controller C2. Furthermore, the abnormalities in the first controller C1 and the second controller C2 are also detectable by the inverters I1 and I2 based on presence/absence of a command.

Figure 6:
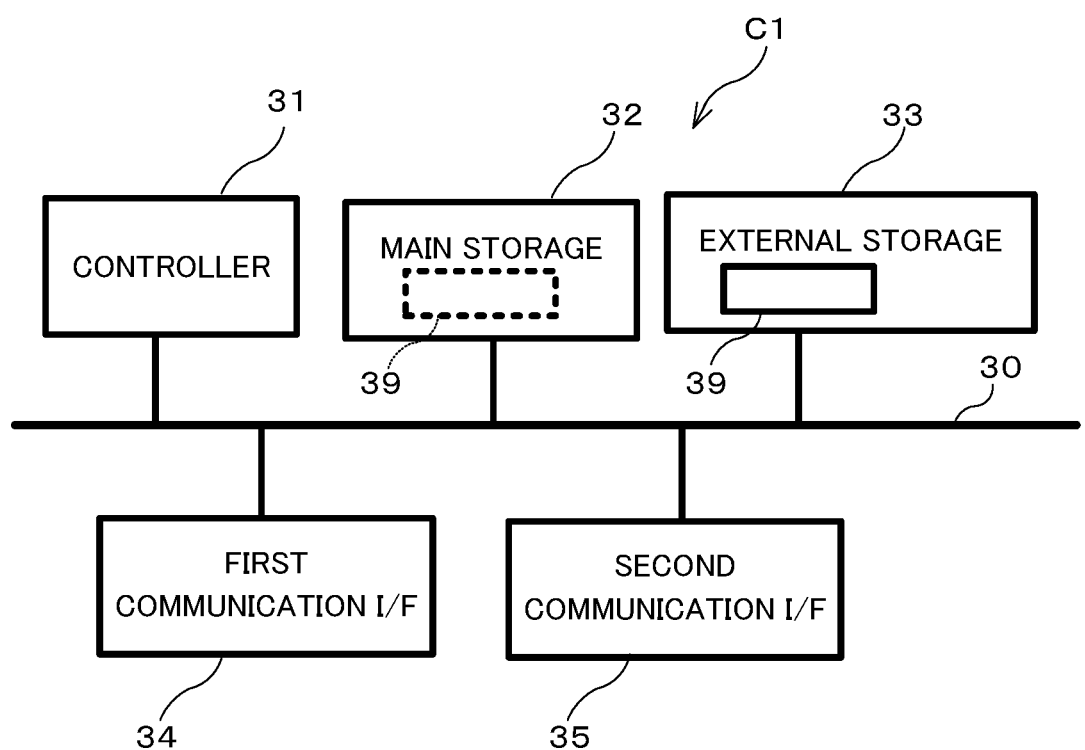
FIG. 6 is a block diagram illustrating hardware configuration of a first controller included in the air-conditioning control system illustrated in FIG. 1.

The first controller C1 includes, as hardware components, a controller 31, a main storage 32, an external storage 33, a first communication interface (IX) 34, and a second communication interface (IX) 35, as illustrated in FIG. 6. The main storage 32, the external storage 33, the first communication I/F 34, and the second communication I/F 35 are each connected to the controller 31 via an internal bus 30.

The controller 31 includes a central processing unit (CPU) and the like. This CPU executes a program 39 stored in the external storage 33 to achieve each element of the first controller C1 illustrated in FIG. 1.

The main storage 32 includes random access memory (RAM) and the like. The program 39 stored in the external storage 33 is loaded into the main storage 32. The main storage 32 is used by the controller 31 as a work area, that is, a temporary storage area for data.

The external storage 33 includes a nonvolatile memory such as a flash memory, a hard disk, a digital versatile disc random-access memory (DVD-RAM), and digital versatile disc rewritable (DVD-RW). The external storage 33 stores in advance the program 39 to be executed by the controller 31. The external storage 33 supplies, in accordance with instructions from the controller 31, to the controller 31 data to be used for execution of the program 39 and stores data supplied from the controller 31.

The first communication I/F 34 is a communication interface that is in conformity with the standard of the first communication network 10. Data for communication in the first communication network 10 is inputted and outputted via the first communication I/F 34.

The second communication I/F 35 is a communication interface that is in conformity with the standard of the second communication network 20. Data for communication in the second communication network 20 is inputted and outputted via the second communication I/F 35.

The second controller C2 has a hardware configuration that is similar to the configuration of the first controller C1 illustrated in FIG. 6. The controller 31 executes the program 39 loaded from the external storage 33 into the main storage 32. The controller 31, by the functions achieved by executing the program 39, generates commands for transmission to the first inverter I1 and the second inverter I2 in accordance with the operation information received from the monitor M via the second communication I/F 35.

Additionally, the controller 31, by the functions achieved by executing the program 39, outputs the generated commands to the first inverter I1 and the second inverter I2 via the first communication I/F 34. Furthermore, the controller 31, by the functions achieved by executing the program 39, inputs the information indicating a state of the air-conditioning operation performed by the first inverter I1 and the second inverter I2 via the first communication I/F 34 and transmits the monitor information including this information to the monitor M via the second communication I/F 35.

Next, processing operation of the air-conditioning control system 1 according to embodiments of the present disclosure is described. Hereinafter, processing operations in the cases of (1)-(4) below are described:

(1) a case in which the first controller C1 and the second controller C2 operate normally;

(2) a first case of occurrence of an abnormality in the first controller C1;

(3) a second case of occurrence of an abnormality in the first controller C1; and (4) a case of occurrence of an abnormality in the temperature sensor 4A or in communication with the monitor M.

Although the cases of (2)-(4) above are cases in which an abnormality occurs in or around the first controller C1, the air-conditioning control system 1 according to the present embodiment executes, processing operations that are similar in a case in which similar abnormality occurs in the second controller C2 or the temperature sensor 4B.

<Case in Which the First Controller C1 and the Second Controller C2 Operate normally>

Figure 7:
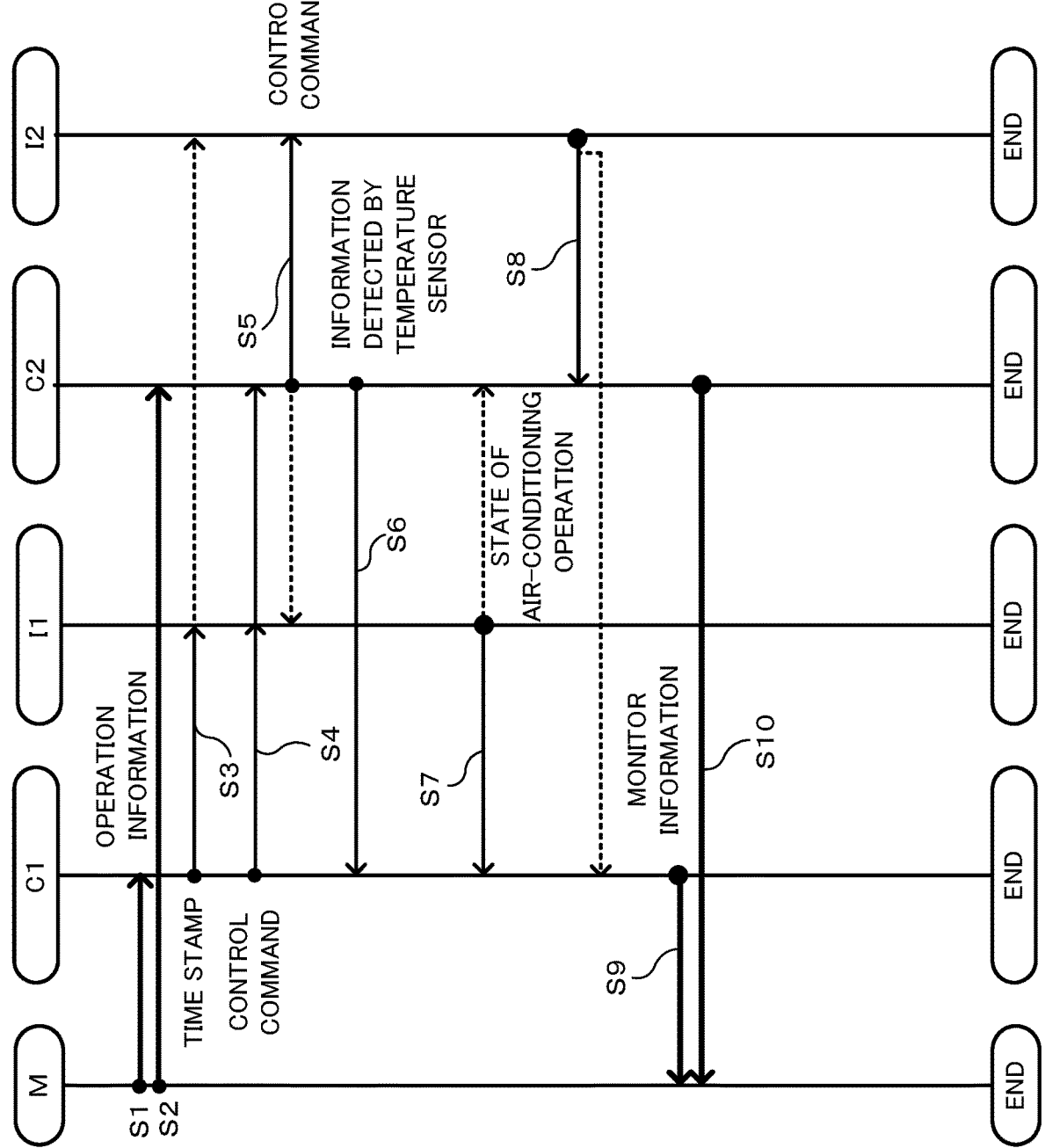
FIG. 7 is a sequence diagram illustrating processing during normal operation by the air-conditioning control system illustrated in FIG. 1.

First, processing operation that is performed in a case in which both the first controller C1 and the second controller C2 operate normally is described. As illustrated in FIG. 7, the monitor M transmits the operation information to the first controller C1 via the second communication network 20 (step S1), and transmits the operation information to the second controller C2 via the second communication network 20 (step S2). The operation information is transmitted by unicasting.

The first controller C1 having received the operation information from the monitor M transmits via the first communication network 10 a timestamp to the first inverter I1, the second controller C2, and the second inverter I2 (step S3).

Then the first controller C1 transmits the control commands to the first inverter I1 and the second inverter I2 via the first communication network 10 (step S4). Additionally, the second controller C2 transmits the control commands to the second inverter I2 and the first inverter I1 via the first communication network 10 (step S5). Examples of the control commands include a command for instruction to rotate at a rotation speed of the compressor CP included in the first driving target 3A and a rotation speed of the compressor CP included in the second driving target 3B.

Then the second controller C2 transmits the information detected by the temperature sensor 4B to the first controller C1 via the first communication network 10 (step S6). Here, the first controller C1 may transmit the information detected by the temperature sensor 4A to the second controller C2.

Thereafter, the first inverter I1 drives the first driving target 3A. Since the first inverter I1 is set to prioritize the command from the first controller C1 over the command from the second controller C2 as illustrated in FIG. 2A, the first inverter I1 drives the first driving target 3A in accordance with the command from the first controller C1. Additionally, the second inverter I2 drives the second driving target 3B. Since the second inverter I2 is set to prioritize the command from the second controller C2 over the command from the first controller C1 as illustrated in FIG. 2A, the second inverter I2 drives the second driving target 3B in accordance with the command from the second controller C2.

Then the first inverter I1 transmits in response the information indicating a state of air-conditioning operation to the first controller C1 and the second controller C2 via the first communication network 10 (step S7). Additionally, the second inverter I2 transmits in response the information indicating a state of air-conditioning operation to the first controller C1 and the second controller C2 via the first communication network 10 (step S8).

Then the first controller C1 transmits in response the monitor information to the monitor M via the second communication network 20 (step S9). Additionally, the second controller C2 transmits in response the monitor information to the monitor M via the second communication network 20 (step S10). The monitor M, the first controller C1, the second controller C2, the first inverter I1, and the second inverter I2 repeat the processes in steps S1-S10, thereby performing processing operation for a series of air-conditioning operations.

<First Case of Occurrence of an Abnormality in the First Controller C1>

Figure 8:
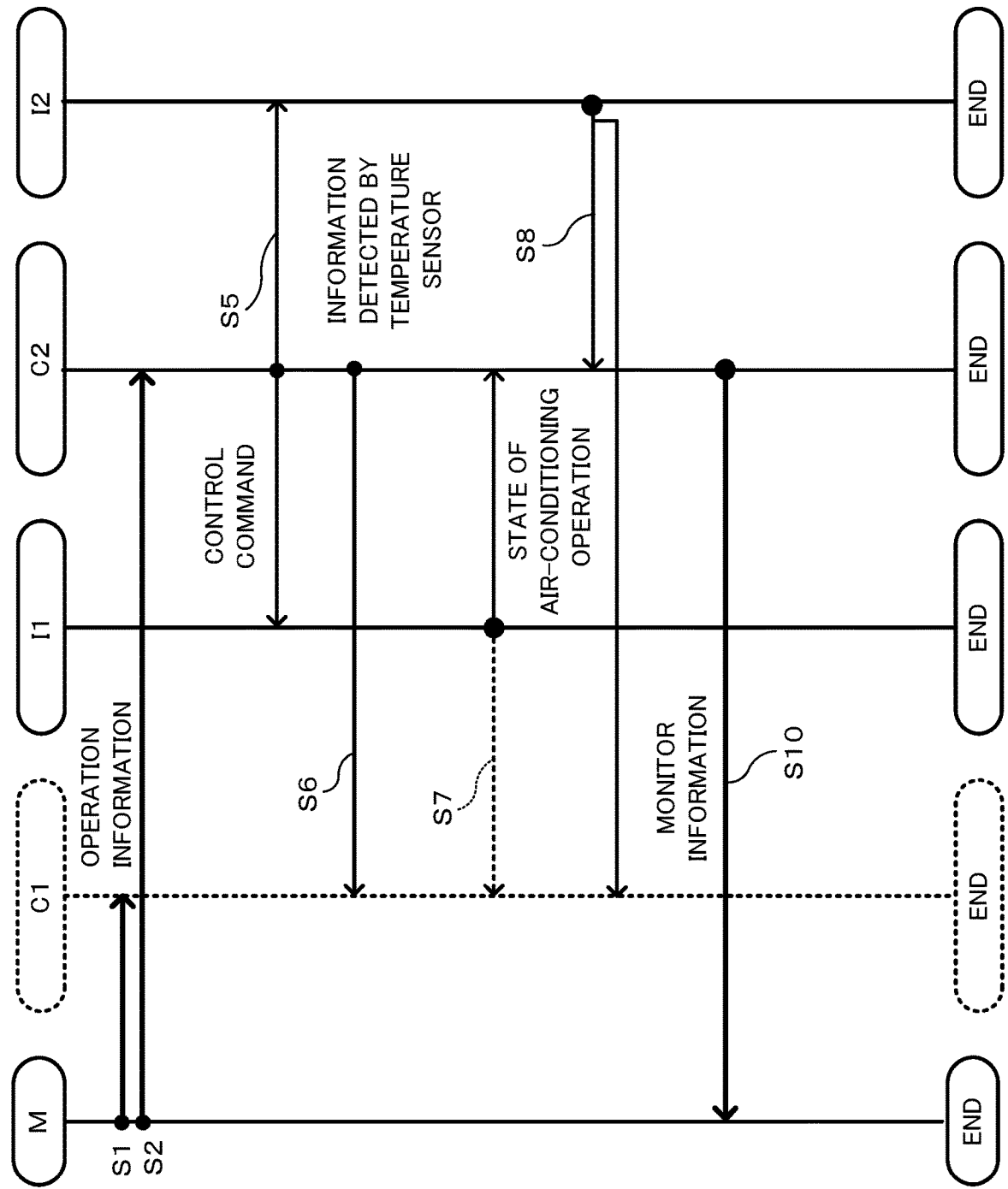
FIG. 8 is a sequence diagram illustrating first processing in a case of occurrence of an abnormality in a controller.

Next, a first example process flow in a case in which an abnormality occurs in the first controller C1 is described. As illustrated in FIG. 8, the monitor M transmits the operation information to the first controller C1 via the second communication network 20 (step S1), and transmits the operation information to the second controller C2 via the second communication network 20 (step S2).

The first controller C1 is, after the aforementioned steps, unable to transmit a timestamp and also is unable to transmit the control command to the first inverter I1 and the second inverter I2, due to occurrence of an abnormality. The second controller C2 detects that the first inverter I1 is not transmitting a command and is not performing control, and transmits the control commands to the second inverter I2 and the first inverter I1 via the first communication network 10 (step S5).

Then the second controller C2 transmits the information detected by the temperature sensor 4A to the first controller C1 via the first communication network 10 (step S6).

Thereafter, the first inverter I1 drives the first driving target 3A. Although the first inverter I1 is set to prioritize the command from the first controller C1 over the command from the second controller C2, since no command is transmitted from the first controller C1, the first inverter I1 drives the first driving target 3A in accordance with the command from the second controller C2.

Additionally, the second inverter I2 drives the second driving target 3B. Since the second inverter I2 is set to prioritize the command from the second controller C2 over the command from the first controller C1, the second inverter I2 drives the second driving target 3B in accordance with the command from the second controller C2.

Then the first inverter I1 transmits in response the information indicating a state of air-conditioning operation to the first controller C1 and the second controller C2 via the first communication network 10 (step S7). Additionally, the second inverter I2 transmits in response the information indicating a state of air-conditioning operation to the first controller C1 and the second controller C2 via the first communication network 10 (step S8).

Then the second controller C2 transmits in response the monitor information to the monitor M via the second communication network 20 (step S10). Thereafter, the second controller C2 causes the first inverter I1 and the second inverter I2 to continue the air-conditioning operation. When the state of air-conditioning operation is changed, the monitor M, the second controller C2, the first inverter I1, and the second inverter I2 repeat the processes in steps S1-S10, thereby performing a series of air-conditioning operations.

<Second Case of Occurrence of an Abnormality in the First Controller C1>

Figure 9:
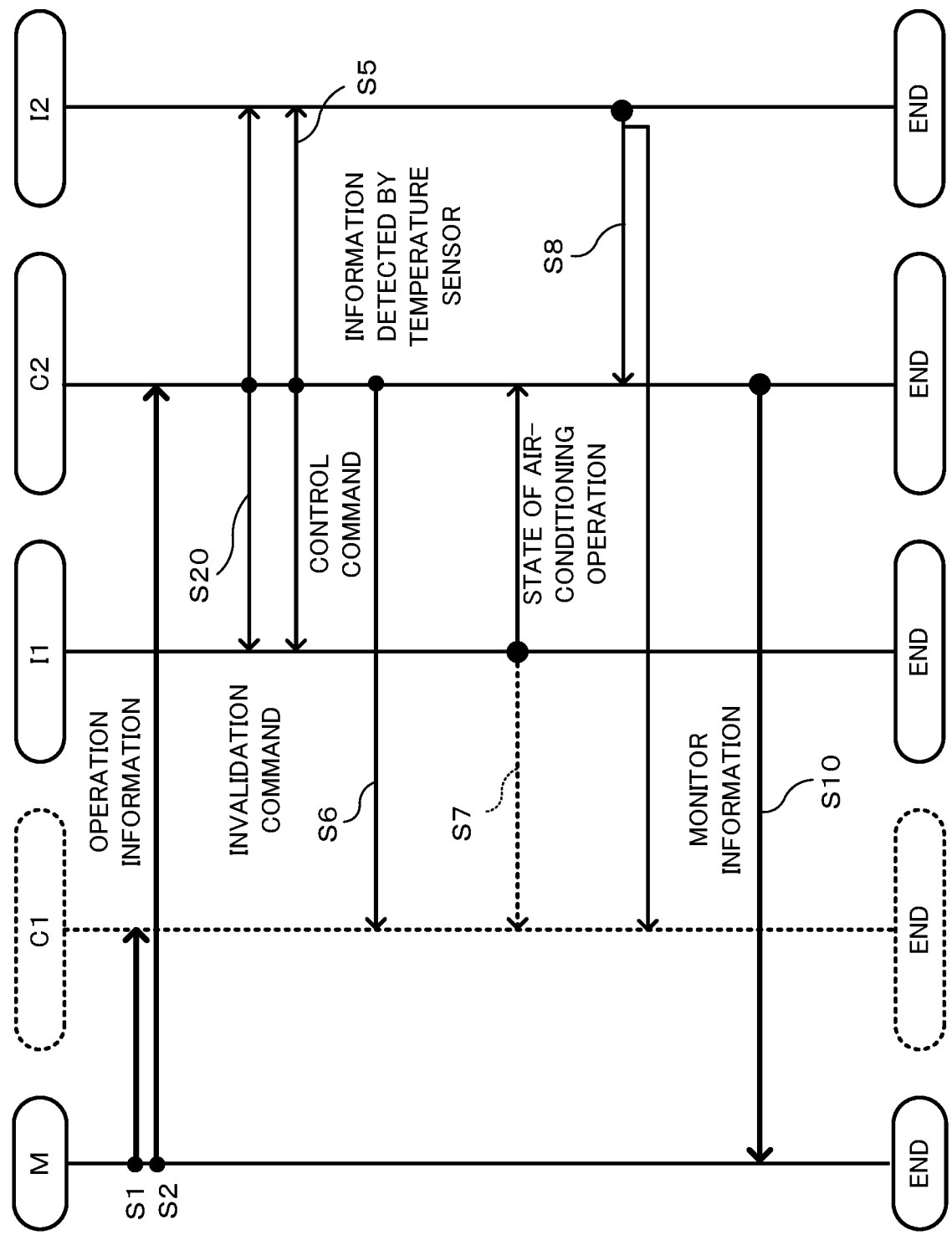
FIG. 9 is a sequence diagram illustrating second processing in a case of occurrence of an abnormality in a controller.

Next, a second example process flow in a case in which an abnormality occurs in the first controller C1 is described. As illustrated in FIG. 9, the monitor M firstly transmits the operation information to the first controller C1 via the second communication network 20 (step S1), and transmits the operation information to the second controller C2 via the second communication network 20 (step S2).

Due to occurrence of an abnormality, the first controller C is unable to transmit a timestamp and also is unable to transmit the control commands to the first inverter I1 and the second inverter I2. The second controller C2, upon detecting that no control command is transmitted from the first controller C1, detects that an abnormality has occurred in the first controller C1, and transmits, to the second inverter I2 and the first inverter I1 via the first communication network 10, the invalidation commands for invalidating a command from the first controller C1 (step S20). Additionally, the second controller C2 transmits the control commands to the second inverter I2 and the first inverter I1 via the first communication network 10 (step S5).

Subsequent processing is similar to that in the first case illustrated in FIG. 8. Thereafter, the second controller C2 causes the first inverter I1 and the second inverter I2 to continue the air-conditioning operation. When the state of air-conditioning operation is changed, the monitor M, the second controller C2, the first inverter I1, and the second inverter I2 repeat the processes in steps S1-S10 and S20, thereby performing processing operation for a series of air-conditioning operations.

<Case of Occurrence of an Abnormality in the Temperature Sensor 4A>

Figure 10:
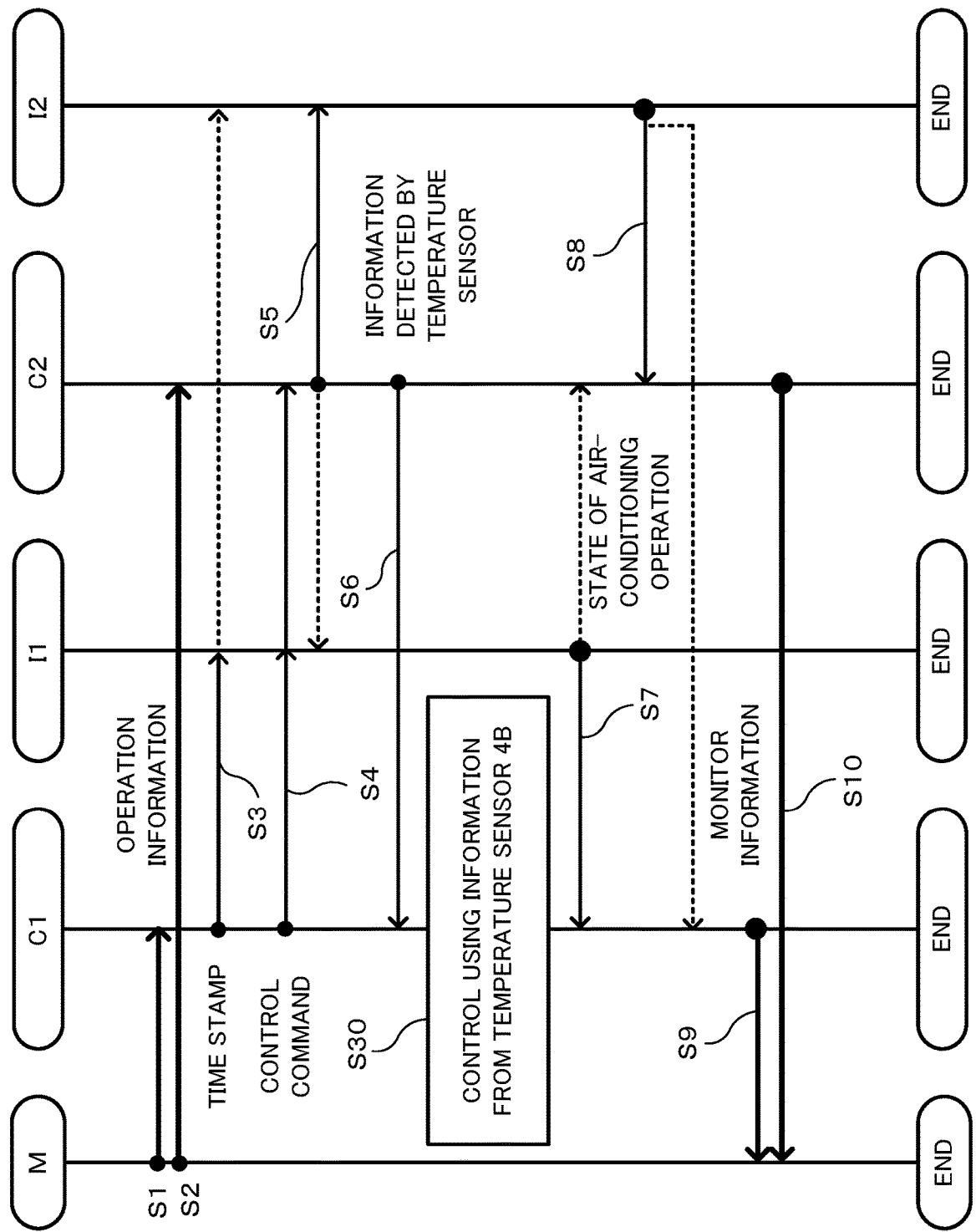
FIG. 10 is a sequence diagram illustrating processing in the case of occurrence of an abnormality in the temperature sensor.

Next, a process flow in a case in which an abnormality occurs in the temperature sensor 4A is described. As illustrated in FIG. 10, the process flow in this case is roughly similar to that performed in the case of operating normally as illustrated in FIG. 7.

In step S6, the second controller C2 transmits the information detected by the temperature sensor 4B to the first controller C1 via the first communication network 10. The first controller C1, after receiving the detection information detected by the temperature sensor 4A, performs control based on the detection information detected by the temperature sensor 4B (step S30).

Then the first inverter I1 transmits in response the information indicating a state of air-conditioning operation to the first controller C1 and the second controller C2 via the first communication network 10 (step S7). Additionally, the second inverter I2 transmits in response the information indicating a state of air-conditioning operation to the first controller C1 and the second controller C2 via the first communication network 10 (step S8).

Then the first controller C1 transmits in response the monitor information to the monitor M via the second communication network 20 (step S9). Additionally, the second controller C2 transmits in response the monitor information to the monitor M via the second communication network 20 (step S10). The monitor M, the first controller C1, the second controller C2, the first inverter I1, and the second inverter I2 repeat the processes in steps S1-S10 and S30, thereby performing control of a series of air-conditioning operations.

In the case of malfunction of the temperature sensor 4A, the first controller C1 may transmit the invalidation commands to the first inverter I1 and the second inverter I2 via the first communication network 10, in order to stop processing operation thereby.

Even in the case in which an abnormality occurs in the temperature sensor 4B, processing similar to the processing illustrated in FIG. 10 may be performed by the first controller C1 and the second controller C2, in order to allow the second controller C2 to perform control of the second inverter I2 based on the information detected by the temperature sensor 4A.

<Case of Occurrence of an Abnormality in Communication with the Monitor M>

Figure 11:
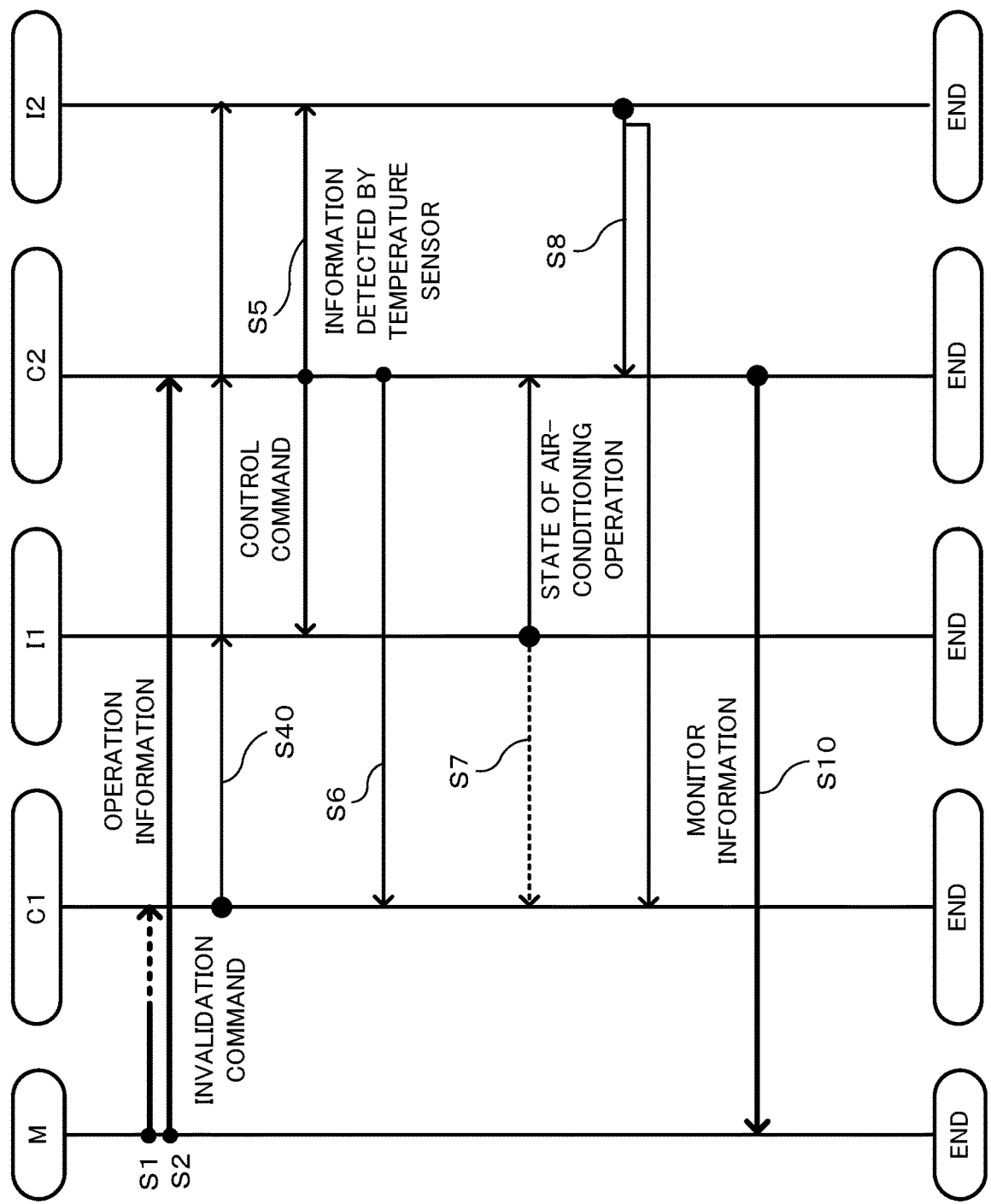
FIG. 11 is a sequence diagram illustrating processing in a case of occurrence of an abnormality in communication with the monitor.

Next, a process flow in a case in which an abnormality occurs in communication with the monitor M is described. As illustrated in FIG. 11, the first controller C1 performs polling and waits until the operation information is received from the monitor M. In the case in which no operation information is received from the monitor M, the first controller C1 determines that an abnormality occurs in communication with the monitor M, and transmits, to the second controller C2, the first inverter I1 and the second inverter I2, the invalidation commands for invalidating a command therefrom.

The second controller C2 determines, based on receiving the invalidation command from the first controller C1, that an abnormality occurs in the first controller C1, and transmits, to the second inverter I2 and the first inverter I1 via the first communication network 10, the invalidation commands for invalidating a command from the first controller C1 (step S5).

Subsequent processing is similar to that in the case illustrated in FIG. 8. Thereafter, the second controller C2 causes the first inverter I1 and the second inverter I2 to continue the air-conditioning operation. When the state of air-conditioning operation is changed, the monitor M, the second controller C2, the first inverter I1, and the second inverter I2 repeat the processes in steps S1-S10 and S40, thereby performing processing operation for a series of air-conditioning operations.

As described above in detail, according the present embodiment, each of the first controller C1 and the second controller C2 is capable of transmitting, to the first inverter I1 and the second inverter I2, that a command transmitted thereby is invalid. This enables addressing, by the first controller C1 itself or the second controller C2 itself, a case in which control by the first controller C1 or the second controller C2 is to be stopped due to various types of factors such as abnormalities in the first controller C1, the second controller C2, the temperature sensors 4A and 4B, or in communication with the monitor M. As a result, redundant configuration is achieved that includes multiple controllers and inverters and allows a controller in which an abnormality has occurred to address the occurrence of abnormality and to cause continuation of normal air-conditioning operation.

Furthermore, according to the present embodiment, a controller detects an abnormality around the controller. This leads to reduction of processing time.

Embodiment 2

Next, Embodiment 2 of the present disclosure is described. In Embodiment 1, an air-conditioning control system 1 is described that has an arrangement that allows the air conditioners 2A and 2B to continue to perform the air-conditioning operation even upon occurrence of an abnormality in the first controller C1 or the second controller C2, abnormalities in the temperature sensors 4A and 4B, or an abnormality in communication with the monitor M. However, the present disclosure is not limited to this embodiment. In the present embodiment, at the same time as the second controller C2 performs control of the first inverter I1 and the second inverter I2, the first controller C1 executes processing other than processing for controlling the first inverter I1 and the second inverter I2. In the present embodiment, this processing is referred to as maintenance processing that is executed for the monitor M and includes downloading log data of the air-conditioning operation by the air conditioners 2A and 2B, that is, maintenance information, or setting parameters for internal processing.

An air-conditioning control system 1 according to the present embodiment has hardware configuration that is similar to the configuration of the air-conditioning control system 1 in Embodiment 1 that is illustrated in FIGS. 1 and 6.

Figure 12:
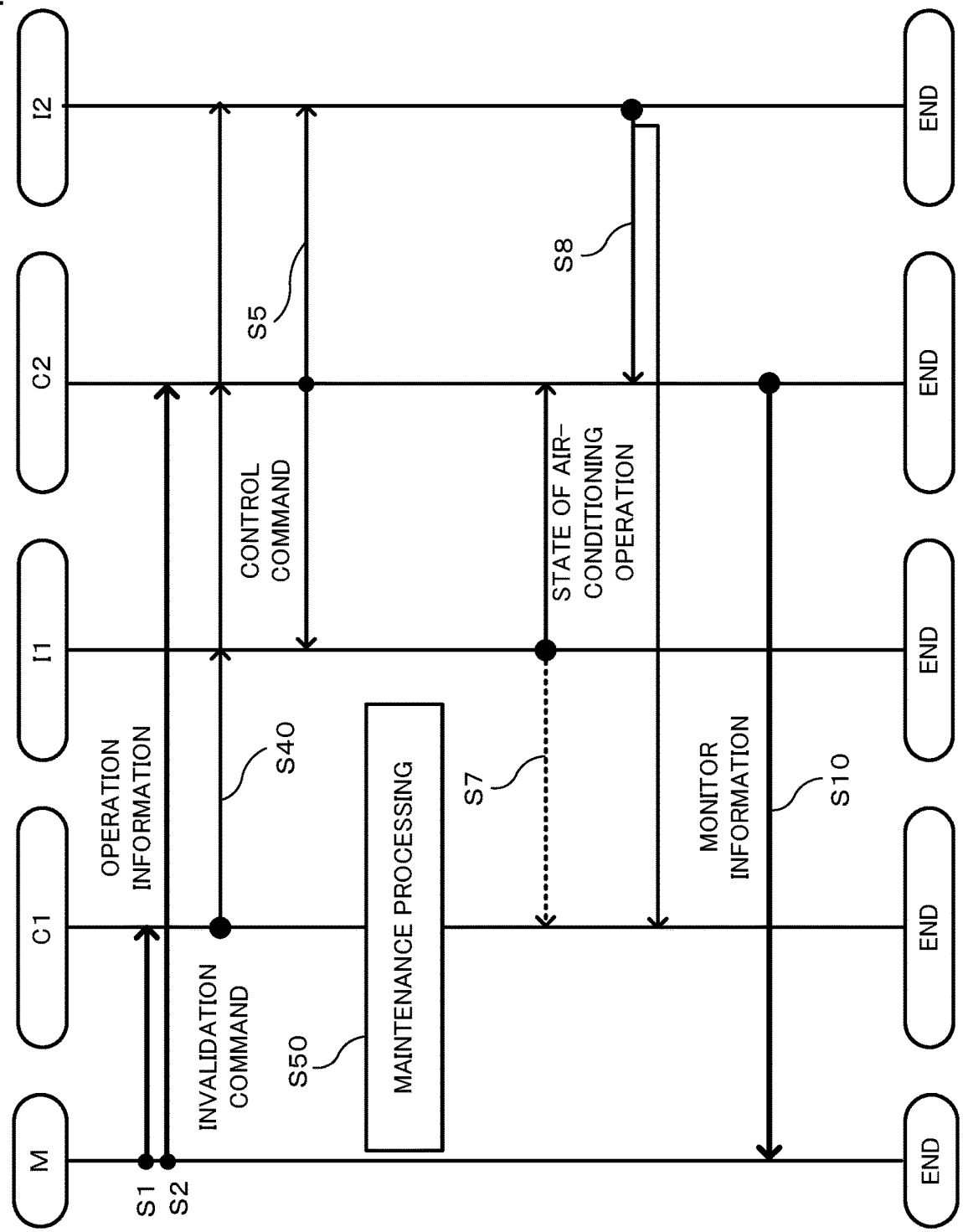
FIG. 12 is a sequence diagram illustrating processing performed by an air-conditioning control system according to Embodiment 2 of the present disclosure.

As illustrated in FIG. 12, the monitor M transmits the operation information to the first controller C1 via the second communication network 20 (step S1), and transmits the operation information to the second controller C2 via the second communication network 20 (step S2). The operation information for the first controller C1 includes a command instructing the first controller C1 to execute the maintenance processing. In this case, the first controller C1 transmits, to the second controller C2, the first inverter I1, and the second inverter I2, via the first communication network 10, invalidation commands for invalidating a command therefrom (step S40).

The operation information for the second controller C2 includes a command instructing the second controller C2 to perform control of the first inverter I1 and the second inverter I2. The second controller C2 transmits the control commands to the second inverter I2 and the first inverter I1 via the first communication network 10 (step S5).

Figure 13:
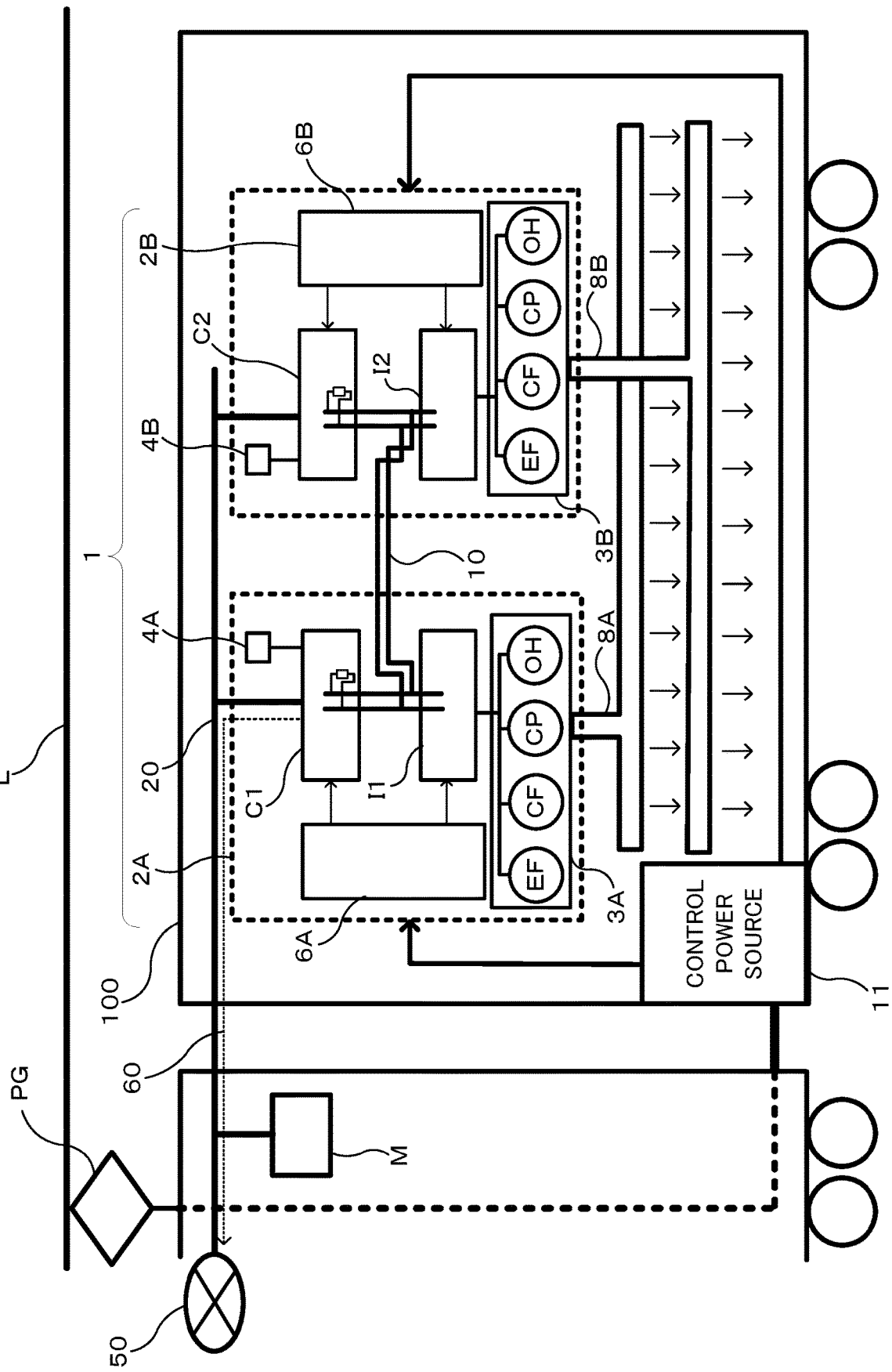
FIG. 13 is a schematic diagram illustrating a first operation of the air-conditioning control system illustrated in FIG. 12.

In contrast, the first controller C1 executes the maintenance processing (step S50). This maintenance processing includes processing for downloading maintenance information or processing for setting parameters for internal processing. In this case, the first controller C1 may, as illustrated in FIG. 13, download maintenance information 60 to a server connected to an external network 50 via the second communication network 20, or a maintenance checker riding on the railroad vehicle 100 may download maintenance information by achieving connection to the first controller C1 using a terminal.

Subsequent processing is similar to that in the case illustrated in FIG. 8. The monitor M, the second controller C2, the first inverter I1, and the second inverter I2 repeat the processes in steps S1-S10, S40 and S50, thereby performing a series of control.

Figure 14:
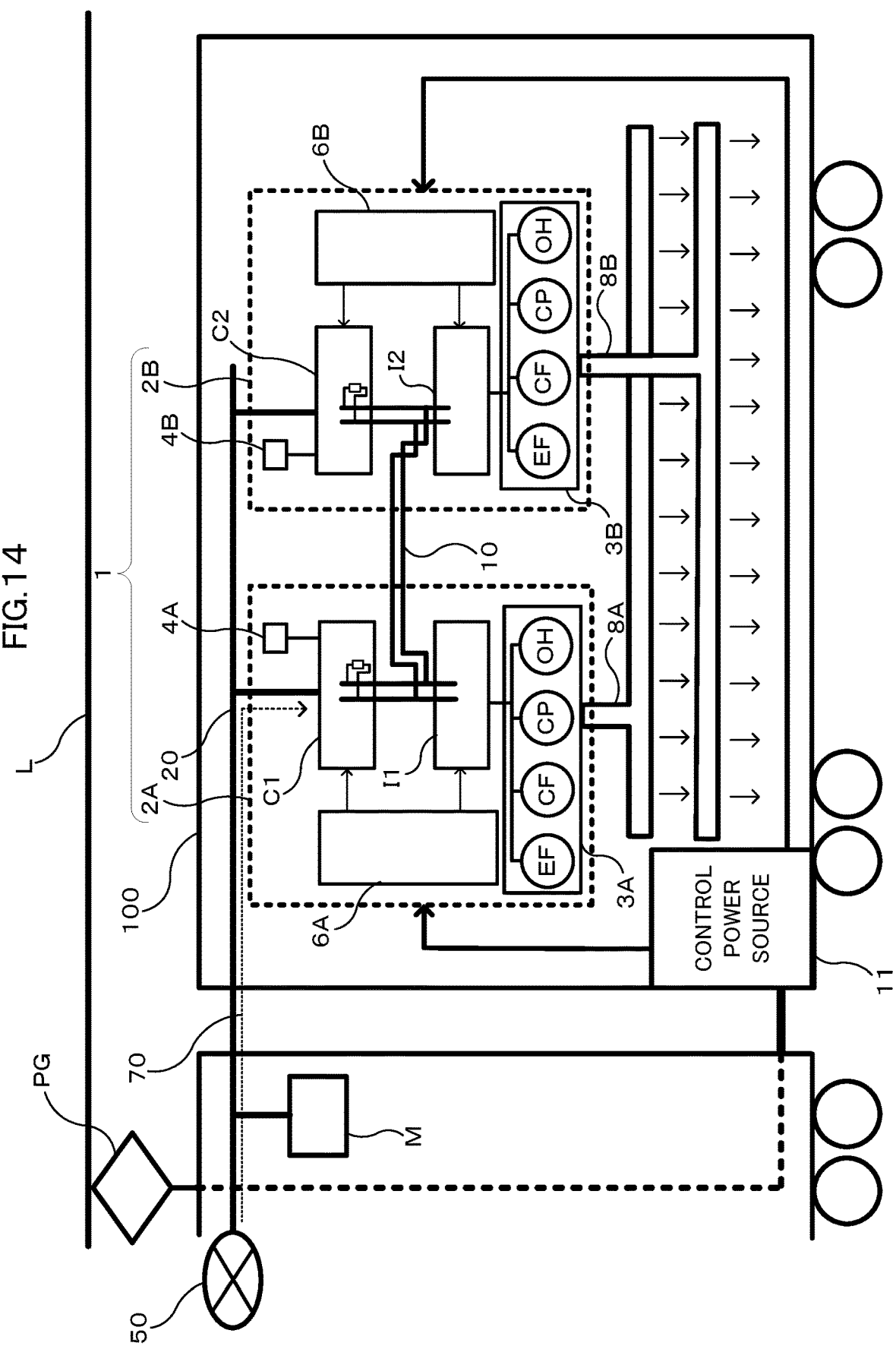
FIG. 14 is a schematic diagram illustrating a second operation of the air-conditioning control system illustrated in FIG. 12.

The present embodiment describes a case in which the first controller C1 executes the maintenance processing and the second controller C2 performs control of the first inverter I1 and the second inverter I2. However, the present disclosure is not limited to such configuration. For example, processing for updating software that operates in the first controller C1 may be executed in step S50, while the second controller C2 performs control of the first inverter I1 and the second inverter I2. In this case, as illustrated in FIG. 14, a software program 70 may be installed as the program 39 in the external storage 33 included in the first controller C1 and illustrated in FIG. 6, from the external network 50 via the second communication network 20.

A configuration may be employed in which the first inverter I1 and the second inverter I2 are controlled by the first controller C1 and the maintenance processing or updating of a software program is executed by the second controller C2.

As described above in detail, according the present embodiment, each of the first controller C1 and the second controller C2 is capable of transmitting, to the first inverter I1 and the second inverter I2, that a command transmitted thereby is invalid. This enables, in a case in which stopping control by a controller is required for maintenance processing or for updating software, to continue the air-conditioning operation by using the other controller. As a result, a configuration is achieved that enables performing maintenance or updating software during running of the railroad vehicle 100.

Figure 15:
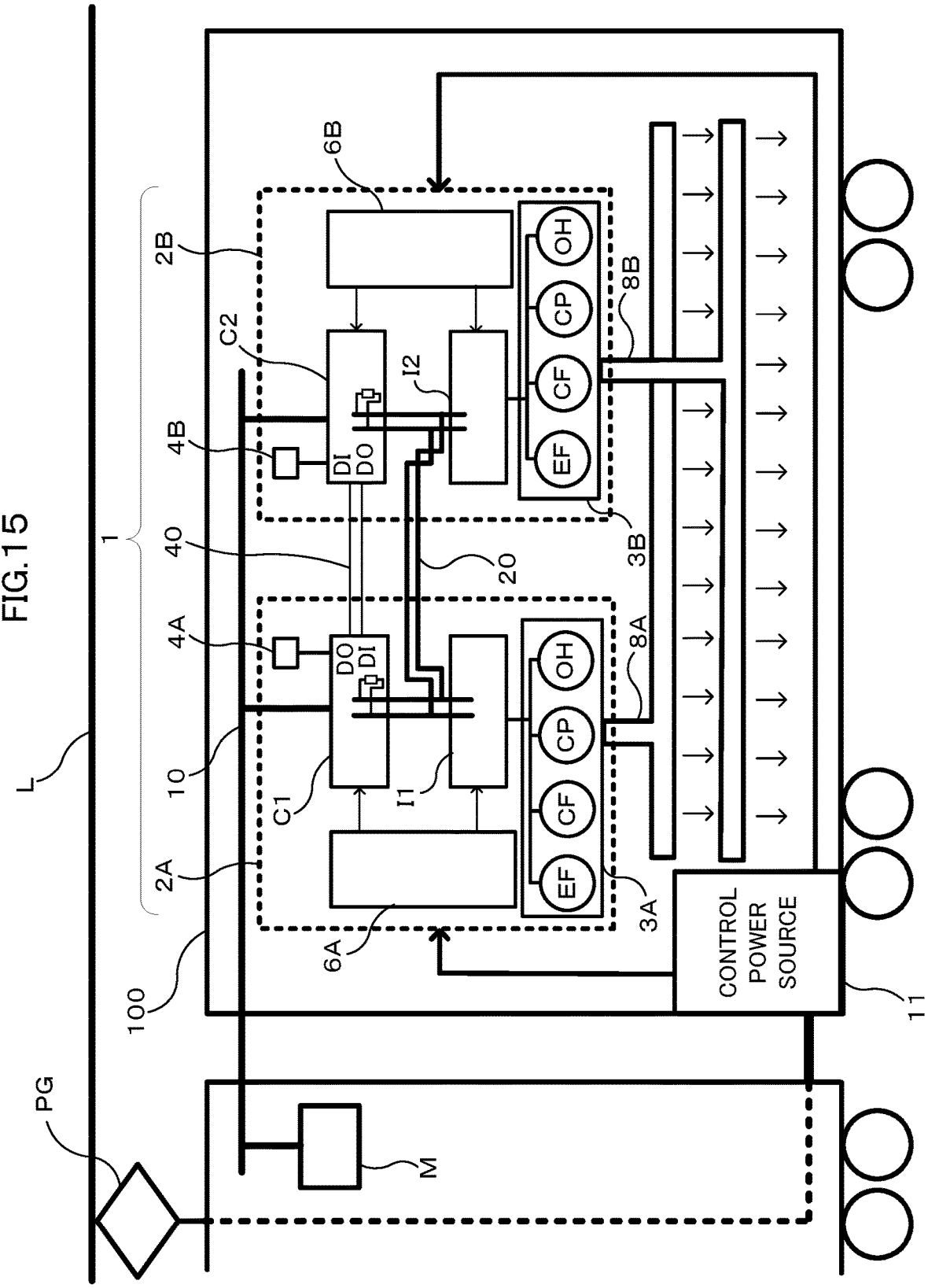
FIG. 15 is a schematic diagram illustrating a modified example of configuration of the air-conditioning control systems according to Embodiments 1 and 2 of the present disclosure.

As illustrated in FIG. 15, a signal line 40 may be arranged between the first controller C1 and the second controller C2, via which each of these controllers outputs an operation-normality signal indicating whether the controller is operating normally. The signal line 40 has terminals DI serving as input terminals and terminals DO serving as output terminals, and has two lines configured oppositely for input/output.

According to the aforementioned embodiments, combination of the controllers and the inverters can be switched without a switch for turning on or off the connection of the first communication network 10. Additionally, according to the aforementioned embodiments, an abnormality in a controller is detectable regardless of whether the controller is a master controller or a slave controller.

The aforementioned embodiments employ the communication network 10 that connects the first controller C1, the second controller C2, the first inverter I1, the second inverter I2, and enables mutual broadcast communication. However, the present disclosure is not limited to such configuration. A communication network that performs unicast data communication may be employed as the first communication network 10 that connects the aforementioned elements. Additionally, an internal bus may be employed, instead of a communication network, as the first transmission line to connect the first controller C1, the second controller C2, the first inverter I1, and the second inverter I2, and the series of control may be achieved by inputting and outputting of signals via the internal bus.

In the aforementioned embodiments, the first controller C1 and the second controller C2 perform the air-conditioning control based on the temperature information detected by the temperature sensors 4A and 4B. However, the present disclosure is not limited to such configuration, and the air-conditioning control may be performed based on first and second sensors that detect other environmental information, including sensors for detection of humidity.

Furthermore, although two air conditioners, and accordingly two controllers and two inverters, are employed in the aforementioned embodiments, the present disclosure is not limited to such configuration, and three or more controllers and three or more inverters may be employed. In the case of three or more controllers and three or more inverters, when an abnormality occurs in or around one or more of the controllers, controllers other than the one or more of the controllers may perform data reception with the monitor M and the inverters to continue air-conditioning operation.

Furthermore, although the first driving target 3A and the second driving target 3B each include the indoor fan EF, the outdoor fan CF, the compressor CP, and the heater OH, the present disclosure is not limited to such configuration. Any one of the indoor fan EF, the outdoor fan CF, the compressor CP, and the heater OH may be omitted, and an element other than the aforementioned elements may be added.

The aforementioned hardware configuration and software configuration of the first controller C1 and the second controller C2 for implementing the air-conditioning control system 1 are merely examples, and may be changed and modified freely.

A portion that serves as a central part for execution of processing by the first controller C1 and the second controller C2 that each include the controller 31, the main storage 32, the external storage 33, the first communication OF 34, the second communication OF 35, and the internal bus 30 is not limited to a dedicated system and may be achieved by a general computer system, For example, distributing a computer program to execute the aforementioned operation by storing the computer program in a computer-readable recording medium and then installing the computer program in a computer can implement the first controller C1 and the second controller C2 for executing the aforementioned processing. Examples of such a recording medium are a flexible disk, a compact disc read-only memory (CD-ROM), and a digital versatile disc read-only memory (DVD-ROM). Furthermore, the computer program may be stored in a storage device included in a server device on a communication network such as the Internet and may be downloaded onto a general computer system, to implement the first controller C1 and the second controller C2.

In the case in which the functions of the first controller C1 and the second controller C2 are implemented by an operating system (OS) by allotment to the OS and an application program or are implemented in cooperation between the OS and the application program, storing in the recording medium and the storage device of only portions of the application program is permissible.

The computer program may be distributed via a communication network by superimposing the computer program on a carrier wave. For example, the computer program may be distributed via a communication network by posting the computer program on a bulletin board system (BBS) on a communication network. Thus, the aforementioned processing may be implemented by starting and executing the computer program in the same manner as other application programs under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Air-conditioning control system
2A, 2B Air conditioner
3A First driving target
3B Second driving target
4A, 4B Temperature sensor
6A First power source
6B Second power source
8A,8B Duct
10 First communication network
11 Control power source
20 Second communication network
30 Internal bus
31 Controller
32 Main storage
33 External storage
34 First communication I/F
35 Second communication I/F 39 Program
40 Signal line
50 External network
60 Maintenance information
70 Software program
100 Railroad vehicle
C1 First controller
C2 Second controller
I1 First inverter
I2 Second inverter
DI, DO Terminal
EF Indoor fan
CF Outdoor fan
CP Compressor
OH Heater
M Monitor
L Overhead wire
PG Pantograph

The invention claimed is:

1. A railroad-vehicle air-conditioning control system comprising:
a first transmission line;
a first inverter to drive a first driving target in accordance with commands received via the first transmission line;
a second inverter to drive a second driving target in accordance with commands received via the first transmission line;
a first controller to, by transmitting commands via the first transmission line, control the first inverter and the second inverter; and
a second controller to, by transmitting commands via the first transmission line, control the first inverter and the second inverter, wherein
an invalidation command for invalidating the commands from each of the first controller and the second controller is transmissible thereby to the first inverter and the second inverter via the first transmission line.

2. The railroad-vehicle air-conditioning control system according to claim 1, wherein, when one controller of the first controller or the second controller detects that the other controller of the first controller or the second controller is not performing control of the first inverter and the second inverter, the one controller transmits control commands to the first inverter and the second inverter via the first transmission line.

3. The railroad-vehicle air-conditioning control system according to claim 2, wherein, when the other controller is not performing the control, an invalidation command for invalidating the commands from the other controller is transmissible from the one controller to the first inverter and the second inverter via the first transmission line.

4. The railroad-vehicle air-conditioning control system according to claim 2, wherein when the one controller detects an occurrence of an abnormality in the other controller, the control commands are transmissible from the one controller to the first inverter and the second inverter via the first transmission line.

5. The railroad-vehicle air-conditioning control system according to claim 1, wherein
the first controller and the second controller are connected to a higher-level monitor device via a second transmission line, and
the command for invalidating the commands from each of the first controller and the second controller is transmissible thereby to the first inverter and the second inverter via the first transmission line upon detecting an abnormality in communication with the higher-level monitor device.

6. The railroad-vehicle air-conditioning control system according to claim 1, wherein
the first controller and the second controller are connected to a higher-level monitor device via a second transmission line, and
the command for invalidating the commands from each of the first controller and the second controller is transmissible thereby to the first inverter and the second inverter via the first transmission line upon receiving from the higher-level monitor device a command instructing not to perform the control of the first inverter and the second inverter.

7. The railroad-vehicle air-conditioning control system according to claim 6, wherein maintenance information is outputtable, as information indicating a state of air-conditioning operation, by the first controller and the second controller, the maintenance information being outputtable by the first controller when the first controller is not performing the control of the first inverter and the second inverter and being outputtable by the second controller when the second controller is not performing the control of the first inverter and the second inverter.

8. The railroad-vehicle air-conditioning control system according to claim 6, wherein software of the first controller is updatable when the first controller is not performing the control of the first inverter and the second inverter, and software of the second controller is updatable when the second controller is not performing the control of the first inverter and the second inverter.

9. The railroad-vehicle air-conditioning control system according to claim 1, further comprising:
a first sensor to connect to the first controller and to detect environment information about a railroad vehicle; and
a second sensor to connect to the second controller and to detect environment information about the railroad vehicle, wherein
the second controller transmits, to the first controller via the first transmission line, the environment information detected by the second sensor, and
the first controller, upon detecting an abnormality in the first sensor, generates commands for the first inverter and the second inverter using the environment information detected by the second sensor.

\* \* \* \* \*